United States Patent
Gajda

(10) Patent No.: US 7,453,016 B1
(45) Date of Patent: Nov. 18, 2008

(54) SELECTIVE HYDROGENATION PROCESS USING LAYERED CATALYST COMPOSITION AND PREPARATION OF SAID CATALYST

(75) Inventor: Gregory J. Gajda, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 350 days.

(21) Appl. No.: 11/312,999

(22) Filed: Dec. 20, 2005

(51) Int. Cl.
*C07C 5/05* (2006.01)
*C07C 5/03* (2006.01)

(52) U.S. Cl. .................. 585/259; 585/260; 585/277
(58) Field of Classification Search ............... 585/259, 585/260, 277
See application file for complete search history.

(56) References Cited

U.S. PATENT DOCUMENTS

| | | | |
|---|---|---|---|
| 4,126,645 A | 11/1978 | Collins | 260/677 A |
| 4,255,253 A | 3/1981 | Herrington et al. | 208/216 PP |
| 4,297,247 A | 10/1981 | Krabetz et al. | 252/468 |
| 4,686,314 A | 8/1987 | Wood et al. | 585/260 |
| 4,764,498 A | 8/1988 | Wissner et al. | 502/251 |
| 4,992,157 A | 2/1991 | Bricker et al. | 208/12 |
| 5,200,382 A | 4/1993 | Cody et al. | 502/204 |
| 5,276,231 A | 1/1994 | Kocal et al. | 585/323 |
| 5,648,576 A | 7/1997 | Nguyen Than et al. | 585/260 |
| 5,677,261 A | 10/1997 | Tenten et al. | 502/439 |
| 5,889,187 A | 3/1999 | Nguyen Than et al. | 585/260 |
| 5,935,889 A | 8/1999 | Murrell et al. | 502/9 |
| 5,955,397 A | 9/1999 | Didillon et al. | 502/339 |
| 6,054,409 A | 4/2000 | Nguyen Thanh et al. | 502/330 |
| 6,177,381 B1 | 1/2001 | Jensen et al. | 502/325 |
| 6,228,800 B1 | 5/2001 | Yamaguchi et al. | 502/339 |
| 6,239,322 B1 | 5/2001 | Didillon et al. | 585/260 |
| 6,288,273 B1 | 9/2001 | Heidemann et al. | 562/542 |
| 6,465,391 B1 | 10/2002 | Cheung et al. | 502/330 |
| 6,509,292 B1 | 1/2003 | Blankenship et al. | 502/330 |
| 6,686,309 B1 | 2/2004 | Didillon et al. | 502/313 |
| 6,756,515 B2 | 6/2004 | Rende et al. | 585/444 |
| 2003/0036476 A1 | 2/2003 | Arnold et al. | 502/325 |

FOREIGN PATENT DOCUMENTS

EP 0542528 B1 1/1996
JP 54157507 A 12/1979

*Primary Examiner*—Thuan Dinh Dang
(74) *Attorney, Agent, or Firm*—Arthur E Gooding

(57) ABSTRACT

A selective hydrogenation process and a layered catalyst composition for use in the selective hydrogenation process are disclosed. The process is useful for the selective hydrogenation of diolefins having from about 8 to about 19 carbon atoms per molecule to monoolefins.

13 Claims, 1 Drawing Sheet

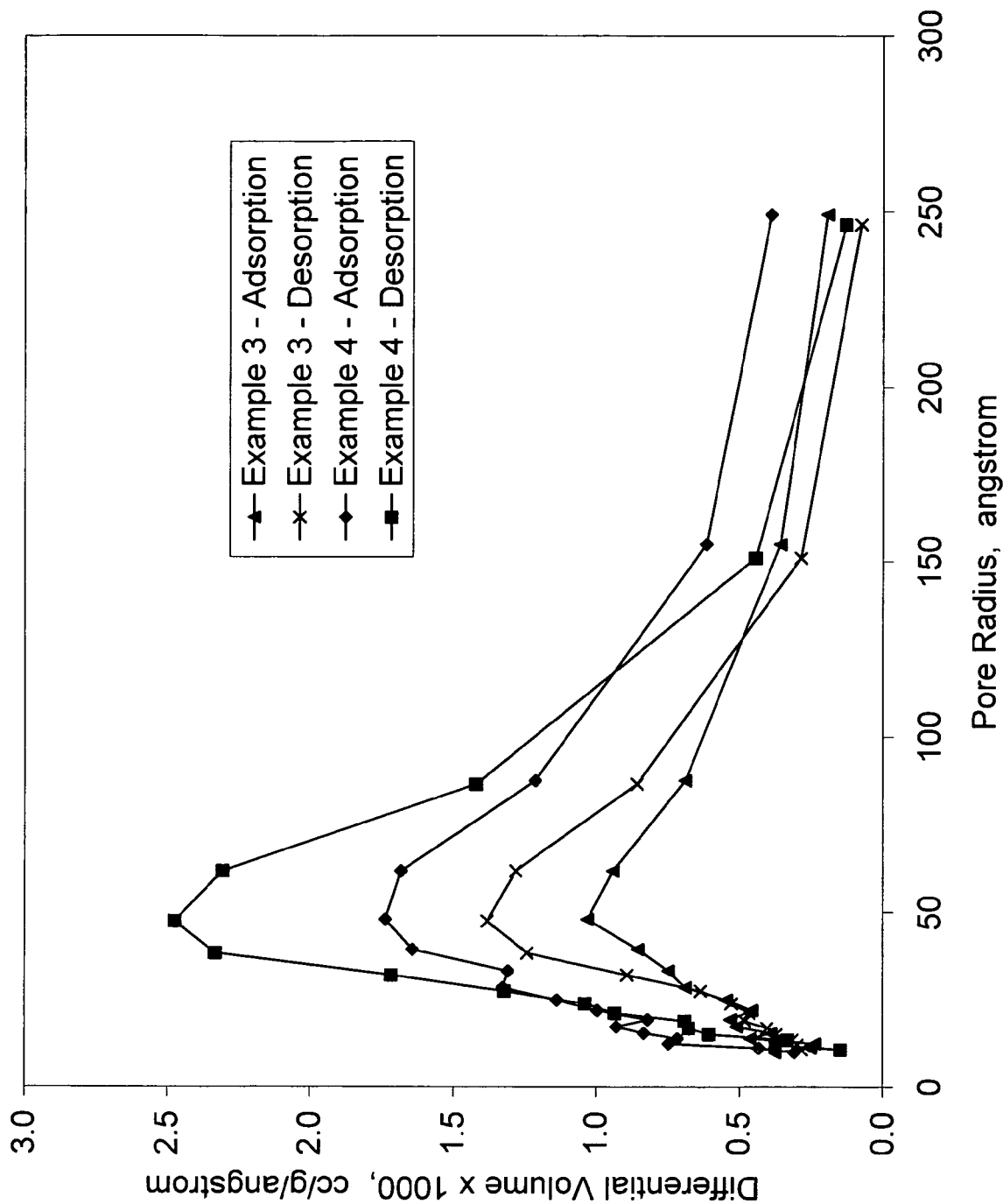

SELECTIVE HYDROGENATION PROCESS USING LAYERED CATALYST COMPOSITION AND PREPARATION OF SAID CATALYST

FIELD OF THE INVENTION

The invention relates to the selective hydrogenation of hydrocarbons. More specifically, the invention relates to the use and preparation of a catalyst to selectively hydrogenate $C_8$-$C_{19}$ diolefins to $C_8$-$C_{19}$ monoolefins.

BACKGROUND OF THE INVENTION

The present invention relates to the use and preparation of a layered catalyst to selectively hydrogenate $C_8$-$C_{19}$ diolefins to $C_8$-$C_{19}$ monoolefins. $C_8$-$C_{19}$ monoolefins are valuable intermediates in the manufacture of alkylbenzene detergent precursors. The layered catalyst composition comprises an IUPAC Group 10 metal and an IUPAC Group 11 metal on a layered composition support. The support comprises an inner core of a refractory inorganic component, such as cordierite and an outer layer of a refractory inorganic component, such as gamma alumina.

Most detergents that are on the worldwide market today are made of linear alkylbenzene sulfonates (LABS). The linear alkylbenzenes sulfonates are preferred because they biodegrade more rapidly than the branched variety. LABS are manufactured from linear alkyl benzenes (LAB). The petrochemical industry produces LAB by catalytically dehydrogenating linear paraffins to linear olefins and then alkylating benzene with the linear olefins in the presence of a catalyst. This linear paraffin dehydrogenation step produces as its major product linear monoolefins. However, it is also well known that the catalytic dehydrogenation step of linear paraffins also produces an amount of linear diolefins. These diolefins do not alkylate benzene in the same way as the monoolefins and therefore do not produce the desired detergent precursors. Selective diolefin hydrogenation converts the diolefins to monoolefins, which can then be used to produce LAB. A detailed outline of LAB processes is provided in U.S. Pat. No. 5,276,231, the contents of which are herein incorporated in its entirety.

The current industrial practice for selectively hydrogenating diolefins or unsaturated hydrocarbon fractions is based on the use of sulfided nickel catalysts operating at moderately high temperatures of approximately 185° C. (365° F.). Sulfur loss from the catalyst to the product occurs and sulfur must be replenished to keep the catalyst active and operating optimally. Furthermore, once the sulfur is lost into the product, in some instances the sulfur must also be removed from the product and this adds another level of processing. U.S. Pat. No. 4,992,157 describes a selective hydrogenation catalyst comprising sulfided nickel and an IUPAC Group 10 metal on an alumina/clay support.

Other types of selective hydrogenation processes are also known, such as that described in JP54157507A. JP 54157507A describes the use of a palladium catalyst on an alumina support to selectively hydrogenate acetylene and methyl acetylene (alkynes) that are present in olefin fractions obtained in petrochemical processes. The catalyst described in JP54157507A comprises a thin alumina coating over an alpha alumina carrier of spherical or cylindrical shape and being around 1-20 mm in size, length and diameter. The alumina precursor, which can be aluminum nitrate, aluminum chloride, aluminum hydroxide and the like, is coated onto the alpha alumina carrier and then the coated alpha alumina carrier and alumina precursor is heat treated at between 400° C. (752° F.) to 700° C. (1292° F.) to create a thin alumina coating over the alpha alumina carrier. A palladium compound such as palladium chloride, palladium nitrate, and the like is dissolved in a suitable solvent, and then applied to the alumina coating to give effectively an enriched surface coating containing palladium. JP54157507A describes the use of the resulting catalyst in the selective hydrogenation of acetylene in a composition comprising ethylene.

The process disclosed herein has been developed to enable one to selectively hydrogenate $C_8$-$C_{19}$ diolefins to $C_8$-$C_{19}$ monoolefins at relatively high space velocities using a layered catalyst that eliminates the need to use a sulfided nickel catalyst for associated sulfur addition (and in some instances the subsequent removal of sulfur from the product).

INFORMATION DISCLOSURE

US 2003/0036476 A1 describes a coated catalyst having a core and a shell surrounding the core, the core is made up of an inert support material. The shell is made up of a porous support substance, and the shell is physically attached to the core. A catalytically active metal selected from the group consisting of the metals of the 10th and 11th groups of the Periodic Table of the Elements is present in finely divided form in the shell. The coated catalyst is described as being suitable for the selective reduction of unsaturated hydrocarbons, specifically lower $C_2$-$C_4$ unsaturated hydrocarbons.

U.S. Pat. No. 6,177,381 B1, which is incorporated by reference in its entirety, describes a layered catalyst composition showing improved durability and selectivity for dehydrogenating hydrocarbons, a process for preparing the catalyst and processes for using the composition. The catalyst composition comprises an inner core such as alpha-alumina, and an outer layer bonded to the inner core composed of an outer refractory inorganic oxide such as gamma-alumina. The outer layer has uniformly dispersed thereon a platinum group metal such as platinum and a promoter metal such as tin. The composition also contains a modifier metal such as lithium. The catalyst composition is prepared by using an organic binding agent such as polyvinyl alcohol which increases the bond between the outer layer and the inner core. The catalyst composition is described as also being suitable for hydrogenation.

BRIEF SUMMARY OF THE INVENTION

The process disclosed herein uses a layered catalyst for the treatment of a hydrocarbon stream containing a mixture of at least $C_8$-$C_{19}$ diolefins and $C_8$-$C_{19}$ monoolefins. The process and catalyst are employed to selectively hydrogenate $C_8$-$C_{19}$ diolefins to $C_8$-$C_{19}$ monoolefins at relatively high space velocities and without hydrogenating substantially the $C_8$-$C_{19}$ monoolefins originally present in the mixture. A process for preparing the layered catalyst is also provided herein.

In accordance with one embodiment of the present invention there is provided a process for selectively hydrogenating a $C_8$-$C_{19}$ diolefin to a $C_8$-$C_{19}$ monoolefin in a hydrocarbon mixture comprising the $C_8$-$C_{19}$ diolefin and the $C_8$-$C_{19}$ monoolefin, the process comprising the steps of:

(i) bringing the hydrocarbon mixture under selective hydrogenation conditions into contact with a catalyst to give substantially a $C_8$-$C_{19}$ monoolefin product;

wherein the catalyst comprises (a) an inner core comprising a first refractory inorganic component, (b) an outer layer bonded to said inner core, said outer layer comprising a second refractory inorganic component having dispersed thereon at least one IUPAC Group 10 metal and at least one IUPAC Group 11 metal.

In one aspect of the embodiment defined above, the process can be further characterized in that the catalyst is prepared by a method comprising depositing the at least one IUPAC Group 10 metal and the at least one IUPAC Group 11 metal on the second refractory inorganic component after the outer layer is bonded to the inner core. In another aspect of the embodiment the process can also be further characterized in that the outer layer is in the presence of a liquid phase during the deposition of the at least one IUPAC Group 10 metal and the at least one IUPAC Group 11 metal onto the second refractory inorganic component.

In accordance with another embodiment of the present invention there is provided a process for preparing a layered catalyst composition for selectively hydrogenating a $C_8$-$C_{19}$ diolefin to a $C_8$-$C_{19}$ monoolefin in a hydrocarbon mixture comprising the $C_8$-$C_{19}$ diolefin and the $C_8$-$C_{19}$ monoolefin at selective hydrogenation conditions comprising a first liquid phase, wherein the catalyst comprises:
  a. an inner core comprising a first refractory inorganic component,
  b. an outer layer bonded to said inner core, the outer layer comprising a second refractory inorganic component having dispersed thereon at least one IUPAC Group 10 metal and at least one IUPAC Group 11 metal, the process comprising:
    i) coating an inner core with a slurry comprising the second refractory inorganic component, depositing on the coated core at least one IUPAC Group 10 metal and at least one IUPAC Group 11 metal in the presence of a second liquid phase, drying the coated core and calcining at a temperature of about 400 to about 900° C. (752 to 1652° F.) for a time sufficient to bond the outer layer to the inner core and provide a layered support; and
    ii) reducing the product of step i) under reduction conditions to provide the layered catalyst composition.

In one aspect this embodiment can be further characterized in that the at least one IUPAC Group 10 metal and the at least one IUPAC Group 11 metal are dispersed on the second refractory inorganic component by an impregnation step.

The selective hydrogenation process disclosed herein is believed to be capable of operating at relatively higher space velocities for a given reaction temperature and equilibrium conversion of diunsaturates than prior processes. Without limiting this invention to any particular theory, it is believed the layered catalyst used in the selective hydrogenation process disclosed herein has less restrictions to diffusion of reactants and products in comparison to previous catalysts. Consequently, it is expected that the temperature required to attain a specified equilibrium conversion would be lower and also that at a given conversion higher space velocities could be attained without excessive reactor temperature. Therefore, less catalyst and a smaller reactor would be needed, which would result in reduction in the capital cost of the process.

BRIEF DESCRIPTION OF THE DRAWING

The attached drawing shows the adsorption and desorption profiles for catalysts of Examples 3 and 4 plotted against the pore radius and the differential volume of the catalysts.

The embodiments and objects of the invention will become clearer after the following detailed description.

DETAILED DESCRIPTION OF THE INVENTION

As stated, a selective hydrogenation process and a layered catalyst composition for use in the selective hydrogenation process are disclosed herein.

Specifically, the process disclosed herein relates to the selective hydrogenation of $C_8$-$C_{19}$ diolefins in a mixture of $C_8$-$C_{19}$ monolefins. The $C_8$-$C_{19}$ diolefins are selectively hydrogenated to the corresponding $C_8$-$C_{19}$ monoolefins with little or no hydrogenation of the original $C_8$-$C_{19}$ monoolefins. The desired $C_8$-$C_{19}$ monoolefin product is typically in the kerosene boiling range and is an intermediate in the manufacture of alkylbenzene detergent precursors. The selective hydrogenation occurs when the hydrocarbon mixture comprising $C_8$-$C_{19}$ diolefins and $C_8$-$C_{19}$ monolefins is brought into contact with a layered catalyst of the invention under selective hydrogenation conditions. Preferred selective hydrogenation conditions for example, without limitation include pressures of about 0 kPa(g) (0 psi(g)) to about 13,789 kpa(g) (2000 psi(g)), temperatures of between 30° C. (86° F.) and 180° C. (356° F.), $H_2$ to diolefin mole ratios of about 1:1 to about 2:1, preferably about 1.1:1 to about 1.5:1 and liquid hourly space velocities (LHSV) of about 0.1 to about 20 $hr^{-1}$.

The layered catalyst composition comprises an inner core composed of a refractory inorganic component, which has substantially lower adsorptive capacity for catalytic metal precursors relative to the outer layer. Examples of refractory inorganic components suitable for the inner core include without limitation alpha alumina, theta alumina, silicon carbide, metals, cordierite, zirconia, titania and mixtures thereof. A preferred inorganic component for the inner core is cordierite.

The inner core can be formed into a variety of shapes such as pellets, extrudates, spheres or irregularly shaped particles. It is recognized, however, that not all materials can be formed into any shape. Preparation of the inner core can be done by means known in the art such as oil dropping, pressure molding, metal forming, pelletizing, granulation, extrusion, rolling methods and marumerizing. A spherical or cylindrical inner core is preferred. Once the inner core is prepared, it is calcined at a temperature of about 400° C. (752° C.) to about 1500° C. (2732° F.).

The inner core is then coated with an outer layer of a refractory inorganic component which is the same or different from the inorganic component which may be used as the inner core. Examples of refractory inorganic components suitable for the outer layer include without limitation alpha alumina, theta alumina, silicon carbide, metals, cordierite, zirconia, titania, gamma alumina, delta alumina, eta alumina, silica/alumina, zeolites, non-zeolitic molecular sieves (NZMS), and mixtures thereof. This outer layer of refractory component is one which has a relatively high surface area of between about 50 and 200 $m^2/g$ based on the weight of the outer layer. The outer layer thickness is between about 50 and 300 micron, preferably between about 50 and 100 micron. The outer layer has a number of pores distributed across its surface. The pores in the outer layer of the catalyst will preferably have an average pore radius of between 65 to 75 Angstrom. The pore radius size distribution will however, vary from approximately 20 to 250 Angstrom. The pore volume is substantially proportional to the thickness of the outer layer and the average radius of the pores. Where the outer layer is approximately 100 micron thick, the total pore volume will be approximately 0.10 to 0.15 cc/g. Where the outer layer is approximately 200 micron thick, the total pore volume will be approximately 0.20 to 0.30 cc/g. The surface area of a catalyst having a 100 micron thick outer layer will be approximately 35 m²/g, while the surface area of a catalyst having a 200 micron thick outer layer will be approximately 65 m²/g, based on the weight of the catalyst.

It should be pointed out that silica/alumina is not a physical mixture of silica and alumina but means an acidic and amorphous material that has been cogelled or coprecipitated. This term is well known in the art, see e.g., U.S. Pat. Nos. 3,909,450; 3,274,124; and 4,988,659, all of which are incorporated by reference in their entireties. Examples of zeolites include, but are not limited to, zeolite Y, zeolite X, zeolite L, zeolite beta, ferrierite, MFI, mordenite and erionite. Non-zeolitic molecular sieves (NZMS) are those molecular sieves which contain elements other than aluminum and silicon and include silicoaluminophosphates (SAPOs) described in U.S. Pat. No. 4,440,871, ELAPOs described in U.S. Pat. No. 4,793,984, MeAPOs described in U.S. Pat. No. 4,567,029 all of which are incorporated by reference in their entireties. A preferred inorganic component for the outer layer is gamma alumina.

A preferred way of preparing a gamma alumina is by the well-known oil drop method which is described in U.S. Pat. No. 2,620,314, which is incorporated by reference in its entirety. The oil drop method comprises forming an aluminum hydrosol by any of the techniques taught in the art and preferably by reacting aluminum metal with hydrochloric acid; combining the hydrosol with a suitable gelling agent, e.g., hexamethylenetetraamine; and dropping the resultant mixture into an oil bath maintained at elevated temperatures (about 93° C. (199° F.)). The droplets of the mixture remain in the oil bath until they set and form hydrogel spheres. The spheres are then continuously withdrawn from the oil bath and typically subjected to specific aging and drying treatments in oil and ammoniacal solutions to further improve their physical characteristics. The resulting aged and gelled spheres are then washed and dried at a relatively low temperature of about 80° C. (176° F.) to 260° C. (500° F.) and then calcined at a temperature of about 455° C. (851° F.) to 705° C. (1301° F.) for a period of about 1 to about 20 hr. This treatment effects conversion of the hydrogel to the corresponding crystalline gamma alumina.

The layer is applied by forming a slurry of the outer refractory component and then coating the inner core with the slurry by means well known in the art. Slurries of inorganic components can be prepared by means well known in the art which usually involve the use of a peptizing agent. For example, any of the transitional aluminas can be mixed with water and an acid such as nitric, hydrochloric, or sulfuric to give a slurry. Alternatively, an aluminum sol can be made by for example, dissolving aluminum metal in hydrochloric acid and then mixing the aluminum sol with the alumina powder.

The slurry can also contain an organic bonding agent which aids in the adhesion of the layer material to the inner core. Examples of this organic bonding agent include but are not limited to polyvinyl alcohol (PVA), hydroxy propyl cellulose, methyl cellulose and carboxy methyl cellulose. The amount of organic bonding agent which is added to the slurry will vary considerably from about 0.1 wt-% to about 3 wt-% of the slurry. How strongly the outer layer is bonded to the inner core can be measured by the amount of layer material lost during an attrition test, i.e., attrition loss. Loss of the second refractory component by attrition is measured by agitating the catalyst, collecting the fines and calculating an attrition loss, in the manner described in Example 11 in U.S. Pat. No. 6,177,381 B1. It has been found that by using an organic bonding agent as described above, the attrition loss is less than about 10 wt-% of the outer layer.

Depending on the particle size of the outer refractory inorganic component, it may be necessary to mill the slurry in order to reduce the particle size and simultaneously give a narrower particle size distribution. This can be done by means known in the art such as ball milling for times of about 30 min to about 5 hr and preferably from about 1.5 to about 3 hr. It has been found that using a slurry with a narrow particle size distribution improves the bonding of the outer layer to the inner core. Without wishing to be bound by any particular theory, it appears that bonding agents such as PVA aid in making an interlocking bond between the outer layer material and the inner core. Whether this occurs by the PVA reducing the surface tension of the core or by some other mechanism is not clear. What is clear is that a considerable reduction in loss of the outer layer by attrition is observed.

The slurry may also contain an inorganic bonding agent selected from an alumina bonding agent, a silica bonding agent or mixtures thereof. Examples of silica bonding agents include silica sol and silica gel, while examples of alumina bonding agents include alumina sol, boehmite and aluminum nitrate. The inorganic bonding agents are converted to alumina silica in the finished composition. The amount of inorganic bonding agent varies from about 2 to about 15 wt-% as the component, and based on the weight of the slurry.

The slurry can also contain a modifier metal selected from the group consisting of alkali metals, alkaline earth metals and mixtures thereof. The alkali and alkaline earth metals which can be used as modifier metals in the practice of this invention include lithium, sodium, potassium, cesium, rubidium, beryllium, magnesium, calcium, strontium and barium. Preferred modifier metals are lithium, potassium, sodium and cesium with lithium and sodium being especially preferred. One method involves preparing the slurry with a solution (preferably aqueous) of a decomposable compound of the modifier metal or modifier metal precursor. By decomposable is meant that upon heating the metal compound is converted to the metal or metal oxide with the release of byproducts. Illustrative of the decomposable compounds of the alkali and alkaline earth metals are the halide, nitrate, carbonate or hydroxide compounds, e.g., potassium hydroxide, lithium nitrate.

Coating of the inner core with the slurry can be accomplished by means such as rolling, dipping, spraying, etc. One preferred technique involves using a fixed fluidized bed of inner core particles and spraying the slurry into the bed to coat the particles evenly. The thickness of the layer can vary considerably, but usually is from about 50 to about 300 micron preferably from about 50 to about 100 micron. It should be pointed out that the optimum layer thickness depends on the use for the catalyst and the choice of the outer refractory component. Once the inner core is coated with the layer of outer refractory inorganic component, the resultant layered support is dried at a temperature of about 100° C. (212° F.) to about 320° C. (608° F.) for a time of about 1 to about 24 hr and then calcined at a temperature of about 400° C. (752° F.) to about 900° C. (1652° F.) for a time of about 0.5 to about 10 hr to effectively bond the outer layer to the inner core and provide a layered catalyst support. Of course, the drying and calcining steps can be combined into one step.

Having obtained the layered catalyst support, the catalytic metals and/or metal precursors can be dispersed on the layered support by means known in the art. Thus, an IUPAC Group 10 and IUPAC Group 11 metal/metal precursor can be dispersed on the outer layer. The IUPAC Group 10 metal and/or metal precursor includes platinum and palladium. The IUPAC Group 11 metal and/or metal precursor includes copper, silver and gold.

The catalytic metals can be deposited on the layered support in any suitable manner known in the art. One method involves impregnating the layered support with a solution (preferably aqueous) of a decomposable compound of the metals or metal precursors. Illustrative of the decomposable compounds of the IUPAC Group 10 metals are chloroplatinic acid, ammonium chloroplatinate, bromoplatinic acid, dinitrodiamino platinum, sodium tetranitroplatinate, palladium chloride, palladium nitrate, diamminepalladium hydroxide, tetraamminepalladium chloride, and organometallic compounds such as palladium bis π-allyl and palladium bis-acetylacetonate. Illustrative of the decomposable compounds of the IUPAC Group 11 metals are copper nitrate, copper acetylacetonate, copper acetate, copper bromide, copper butanoate, copper chloride, copper chlorate, copper citrate, copper formate, copper perchlorate, copper tartrate, silver nitrate, silver acetate, silver carbonate, silver chlorate, silver nitrite, silver perchlorate, and gold bromide.

The catalyst also preferably contains an alkali or alkaline earth metal from IUPAC Groups 1 or 2, examples of which include without limitation lithium, sodium, potassium, cesium, rubidium, beryllium, magnesium, calcium, strontium and barium, preferably sodium or potassium.

All of the metals can be impregnated into the outer layer using one common solution or they can be sequentially impregnated in any order, but not necessarily with equivalent results. A preferred impregnation procedure involves the use of a steam-jacketed rotary dryer. The catalyst support is immersed in the impregnating solution containing the desired metal compound contained in the dryer and the support is tumbled therein by the rotating motion of the dryer. The catalyst support is in the presence of a liquid phase, and preferably in an all-liquid phase. The impregnating solution is present in an excess relative to the amount of catalyst support so that free liquid is present. Precipitation of the metals is prevented by proper control of the pH of the impregnating solution. Evaporation of the solution in contact with the tumbling support is expedited by applying steam to the dryer jacket. The resultant composite is allowed to dry under ambient temperature conditions, or dried at a temperature of about 80° C. (176° F.) to about 110° C. (230° F.), followed by calcination at a temperature of about 400° C. (752° F.) to about 700° C. (1292° F.) for a time of about 1 to about 4 hr, thereby converting the metal compound to the metal or metal oxide.

In one method of preparation the method involves adding one or more of the metal components to the outer refractory component prior to applying it as a layer onto the inner core. For example, either the IUPAC Group 10 or Group 11 metal or both can be added to the slurry. Thus, in one method, the catalytic metals are deposited onto the outer refractory component prior to depositing the second refractory component as a layer onto the inner core. The catalytic metals can be deposited onto the outer refractory component powder in any order although not necessarily with equivalent results.

As a final step in the preparation of the layered catalyst composition, the catalyst composition is reduced under hydrogen or other reducing atmosphere in order to ensure that the IUPAC Group 10 and 11 metal components are in the metallic state (zero valent). Reduction is carried out at a temperature of about 100° C. (212° F.) to about 650° C. (1202° F.) for a time of about 0.5 to about 10 hr in a reducing environment, preferably dry hydrogen.

In the preferred embodiments the metals are uniformly distributed throughout the outer layer of outer refractory component and are substantially present only in the outer layer. It is also preferred that the IUPAC Group 10 and 11 metals be distributed uniformly through the outer layer. Preferably the ratio of the IUPAC Group 10 to the IUPAC Group 11 metal over the outer layer of the refractory component is substantially constant.

The shape and size of the catalyst particles depends on a number of technical and economic factors and considerations, such as the allowable pressure drop across the selective hydrogenation reactor, the amount of catalyst and the cost of production. The preferred shape of the particle is spherical. It is preferred that the catalyst particle has a diameter of about 0.8 mm (1/32 in.) to 6.4 mm (1/4 in.), preferably about 1.6 mm or 1600 micron (1/16 in.).

The hydrogenatable hydrocarbon mixtures used in the selective hydrogenation process disclosed herein contain a diunsaturate, preferably a diolefin, and a monounsaturate, preferably a monoolefin. The unsaturates are preferably aliphatic olefins having from about 8 to about 19, often 9 to 16, carbon atoms per molecule. In the monoolefin the positioning of the olefinic bond is not critical to the selective hydrogenation process disclosed herein. Conjugated diolefins, however, are more readily selectively hydrogenated to monoolefins than are nonconjugated diolefins. The position of the olefinic bond in the monoolefin is not critical when the monoolefin is used in the manufacture of alkylbenzene detergent precursors as most alkylation catalysts have been found to promote migration of the olefinic bond. The branching of the hydrocarbon backbones of the monoolefin and the diolefin are not critical to the selective hydrogenation process disclosed herein. However, the branching of the hydrocarbon backbone of the monoolefin is often more of a concern as the structural configuration of the alkyl group on the alkylbenzene product can affect performance. For instance, where alkylbenzenes are sulfonated to produce surfactants, undue branching can adversely affect the biodegradability of the surfactant. On the other hand, some branching may be desired such as the lightly branched modified alkylbenzenes described in U.S. Pat. No. 6,187,981 B1. The olefin, be it the monoolefin or the diolefin, may be unbranched or lightly branched, which as used herein, refers to an olefin having three or four primary carbon atoms and for which none of the remaining carbon atoms are quaternary carbon atoms. A primary carbon atom is a carbon atom which, although perhaps bonded also to other atoms besides carbon, is bonded to only one carbon atom. A quaternary carbon atom is a carbon atom that is bonded to four other carbon atoms.

The aliphatic monoolefin is usually a mixture of two or more monoolefins, and the aliphatic diolefin is usually a mixture of two or more diolefins. For commercial processes, other components may be present with the olefin-containing aliphatic compounds. For instance, the monoolefin and the diolefin may be obtained by the dehydrogenation of a paraffinic feedstock and undehydrogenated paraffin, which is difficult to separate from the olefins, is passed to the selective hydrogenation reactor. The unreacted paraffin may be one or more normal or branched paraffins having from about 8 to 19, often 9 to 16, carbon atoms per molecule. See, for instance, U.S. Pat. No. 6,670,516 B1, herein incorporated by reference. Generally, where olefin is obtained by the dehydrogenation of a paraffinic feedstock, the molar ratio of olefin to paraffin is between about 1:12 to 1:8; however, such amounts of paraffin are not critical to the processes of this invention. Indeed, olefin-containing feedstocks having an essential absence of paraffins are suitable.

The concentrations of monoolefins and diolefins in the hydrogenatable hydrocarbon mixtures are not critical to the selective hydrogenation process disclosed herein. The mixture can contain from about 0.5 to about 95 mol-% monoolefins and from about 0.1 to about 20 mol-% diolefins. A suitable mixture produced by the dehydrogenation of a paraffinic feedstock usually contains from about 10 to about 15 mol-% monoolefins and from about 0.5 to about 1.5 mol-% diolefins. The molar ratio of monoolefins to diolefin in the mixture is typically from about 50:1 to about 5:1, preferably about 25:1 to about 7:1.

The source of the paraffinic feedstock for dehydrogenation is not critical although certain sources of paraffinic feedstocks will likely result in certain impurities being present. Conventionally, kerosene fractions produced in petroleum refineries either by crude oil fractionation or by conversion processes therefor form suitable feed mixture precursors. Fractions recovered from crude oil by fractionation will typically require hydrotreating for removal of sulfur and/or nitrogen prior to being fed to the subject process. The boiling point range of the kerosene fraction can be adjusted by prefractionation to adjust the carbon number range of the paraffins. In an extreme case the boiling point range can be limited such that only paraffins of a single carbon number predominate. Kerosene fractions contain a very large number of different hydrocarbons and the feed mixture to the subject process can therefore contain 200 or more different compounds.

The paraffinic feedstock may alternatively be at least in part derived from oligomerization or alkylation reactions. Such paraffinic feedstock mixture preparation methods are inherently imprecise and produce a mixture of compounds. The paraffinic feedstock mixtures to the dehydrogenation process may contain quantities of paraffins having multiple branches and paraffins having multiple carbon atoms in the branches, cycloparaffins, branched cycloparaffins, or other compounds having boiling points relatively close to the desired compound isomer. Thus, the paraffinic feedstock mixtures to the dehydrogenation step can also contain sizable quantities of aromatic hydrocarbons.

Another source of paraffins is in condensate from gas wells. Usually insufficient quantities of such condensate are available to be the exclusive source of paraffinic feedstock. However, its use to supplement other paraffinic feedstocks can be desirable. Typically these condensates contain sulfur compounds, which have restricted their use in the past. As the selective hydrogenation process disclosed herein enables the use of sulfur-containing feeds, these condensates can be used to supply paraffins for alkylation. Paraffins may also be produced from synthesis gas (Syngas), hydrogen and carbon monoxide. This process is generally referred to as the Fischer-Tropsch process. Syngas may be made from various raw materials including natural gas and coal, thus making it an attractive source of paraffinic feedstock where petroleum distillates are not available.

In some instances it may be desired to locate an alkylbenzene facility at a location where a kerosene fraction is not readily available, or other commercial uses for a kerosene fraction render it less economically attractive as a feedstock for making alkylbenzenes. In these instances the ability to use alternative feedstocks is highly desirable. Alternative feedstocks include other petroleum fractions, especially naphtha range fractions, and synthesized hydrocarbons such as Fischer-Tropsch materials. These raw materials have a lower molecular weight than the sought olefins for alkylation and accordingly must be subjected to a dimerization or a metathesis to generate olefins of suitable chain length (detergent range olefins). Numerous processes have been disclosed for preparing detergent olefins from these alternative feedstocks. See, for instance, WO 2004/072005A1, WO 2004/072006A1, U.S. Patent Application Publications 2004/0030209A1, 2004/0176655A1, and 2004/0199035A1. In one arrangement, the hydrogenatable hydrocarbon mixture can be produced by dehydrogenating a feed containing $C_5$ and $C_6$ paraffins to produce $C_5$ and $C_6$ olefins and then reacting the $C_5$ and $C_6$ olefins under chain growth conditions to provide a detergent range olefin product comprising $C_{10}$ to $C_{12}$ monoolefins. The chain growth reaction step can be dimerization or metathesis which may be in combination with oligomerization.

The hydrogenatable hydrocarbon mixture to the selective hydrogenation process disclosed herein should be sufficiently free of impurities, such as water, nitrogen compounds and sulfur compounds, that can unduly adversely affect the life of the selective hydrogenation catalyst. The hydrogenatable hydrocarbon mixture may also contain aromatic byproducts produced by dehydrogenation of the paraffinic feedstock, as described in U.S. Pat. No. 5,276,231. Alternatively, the selective aromatics removal process described in U.S. Pat. No. 5,276,231 may be used to remove some or essentially all of the aromatic byproducts upstream of the selective hydrogenation process disclosed herein.

In the selective hydrogenation process disclosed herein, hydrogenatable hydrocarbon mixtures of $C_8$-$C_{19}$ diolefins and $C_8$-$C_{19}$ monoolefins are contacted with the catalyst disclosed herein in a selective hydrogenation zone maintained under selective hydrogenation conditions. This contacting can be accomplished in a fixed catalyst bed system, a moving catalyst bed system, a fluidized bed system, etc., or in a batch-type operation. A fixed bed system is preferred. In this fixed bed system the hydrocarbon feed stream is preheated to the desired reaction temperature and then flowed into the selective hydrogenation zone containing a fixed bed of the catalyst. The selective hydrogenation zone may itself comprise one or more separate reaction zones with temperature regulation means there between to ensure that the desired reaction temperature can be maintained at the entrance to each reaction zone. The hydrocarbon may be contacted with the catalyst bed in either upward, downward or radial flow fashion. Downflow of the hydrocarbon through a fixed catalyst bed is preferred. The catalyst may be in the presence of a liquid phase, and preferably in either an all-liquid phase or at supercritical conditions.

The conditions for carrying out selective hydrogenation processes are well known in the art and can be carried out in a batch type or a continuous type operation. Generally, selective hydrogenation conditions include pressures of about 0 kpa(g) (0 psi(g)) to about 13,789 kpa(g) (2000 psi(g)), temperatures of about 30° C. (86° F.) to about 180° C. (356° F.), $H_2$ to diunsaturate mole ratios of about 5:1 to about 0.1:1 and a liquid hourly space velocity (LHSV) of about 0.1 to about 20 hr$^{-1}$. It is recognized that achieving conditions where the lower $H_2$ to diunsaturate mole ratios is less than about 1:1 would only be desirable if the conversion needed to be limited. As used herein, diunsaturate includes both diolefinic compounds and compounds having a triple bond. As used herein, the abbreviation "LHSV" means liquid hourly space velocity, which is defined as the volumetric flow rate of liquid per hour divided by the catalyst volume, where the liquid volume and the catalyst volume are in the same volumetric units.

The effluent stream from the selective hydrogenation zone generally will contain unconverted hydrogenatable hydrocarbons, hydrogen and the products of hydrogenation reactions. This effluent stream may be cooled and passed to a hydrogen separation zone to separate a hydrogen-rich vapor phase from a hydrocarbon-rich liquid phase. A separate hydrogen separation zone may not be needed where the $H_2$ to diunsaturate mole ratio is near to 1:1. The hydrocarbon-rich liquid phase, or the effluent stream in the absence of a separate hydrogen separation zone, is separated by means of either a suitable selective adsorbent, a selective solvent, a selective reaction or reactions or by means of a suitable fractionation scheme. Unconverted hydrogenatable hydrocarbons are recovered and may be recycled to the selective hydrogenation zone. The $C_8$-$C_{19}$ monoolefin products of the hydrogenation reactions are recovered as final products or as intermediate products in the preparation of other compounds.

The hydrogenatable hydrocarbons usually do not need to be admixed with a diluent material before, while or after being flowed to the selective hydrogenation zone. The selective hydrogenation reactions of the diunsaturates to monounsaturates are considered to be only slightly exothermic, and the temperature rise in the selective hydrogenation reactor is typically not excessive. The selective hydrogenation reactor preferably does not have indirect heat exchange means to remove the heat as it is produced and the reactor may be adiabatic. If used, the diluent material may be hydrogen or a paraffin having from 8 to 19 carbon atoms per molecule. Any diluent passed to the selective hydrogenation zone will typically be separated from the effluent and recycled to the selective hydrogenation reaction zone.

The following examples are presented in illustration of this invention and are not intended as undue limitations on the generally broad scope of the invention as set out in the appended claims.

EXAMPLES

Example 1

One catalyst of the invention was prepared by impregnating a cordierite sphere having a 100 micron outer layer of alumina with a liquid solution of palladium nitrate, copper nitrate and potassium nitrate. The resulting solution was evaporated to dryness and the sample was calcined at 450° C. (842° F.). The sample was then reduced at 200° C. (392° F.) with hydrogen. Standard impregnation conditions and techniques were employed and the following metal loadings based on the weight of the catalyst were achieved: 0.02 wt-% Pd, 0.038 wt-% Cu and 0.33 wt-% K.

Example 2

A second catalyst of the invention was prepared by impregnating a cordierite sphere having a 100 micron outer layer of alumina with a liquid solution of palladium nitrate, silver nitrate and potassium nitrate. The resulting solution was evaporated to dryness and the sample was calcined at 450° C. (842° F.). The sample was then reduced at 200° C. (392° F.) with hydrogen. Standard impregnation conditions and techniques were employed and the following metal loadings based on the weight of the catalyst were achieved: 0.02 wt-% Pd, 0.065 wt-% Ag, and 0.33 wt-% K.

The diolefin conversion and selectivity of the catalysts prepared in Examples 1 and 2 were studied using as feed the product of a commercial catalytic dehydrogenation unit. Based on analyses of other similar feeds from the same source, the feed used in Examples 1 and 2 is believed to have the composition shown in Table 1. A volume of the catalyst to be tested was loaded in a reactor, and the feed flow was started under selective hydrogenation conditions. Throughout the test, the pressure was maintained at approximately 3447 kPa (g) (500 psi(g)), the LHSV was approximately 5 hr$^{-1}$, and a liquid phase was present. The catalyst was evaluated over a range of 35° C. (95° F.) to 85° C. (185° F.). The molar ratio of hydrogen to diolefin was 1.4. The results obtained at 55° C. (131° F.) for the catalysts prepared in Examples 1 and 2 are shown in Table 2.

Comparative Example 1

A first reference catalyst comprising 0.1% palladium on a spherical alumina support was evaluated. A volume of this reference catalyst was tested in the manner described in Example 2. The results obtained are shown in Table 2.

Comparative Example 2

A second reference catalyst containing sulfided nickel dispersed on an alumina support was evaluated. A volume of this second reference catalyst was tested in the manner described in Example 2, except that the catalyst was evaluated at a temperature of 185° C. (365° F.) and the molar ratio of hydrogen to diolefin was 1.5. The results obtained are shown in Table 2.

Comparative Example 3

A third reference catalyst containing sulfided nickel dispersed on an alumina support was evaluated. This reference catalyst contained less nickel than the second reference catalyst. A volume of this third reference catalyst was tested in the manner described in Comparative Example 2. The results obtained are shown in Table 2.

TABLE 1

| Component | Concentration, wt % |
|---|---|
| C8-minus hydrocarbons | 0.31 |
| C9 paraffins | 0.14 |
| C10 paraffins | 14.79-14.90 |
| C10 monoolefins | 1.73 |
| C11 paraffins | 27.89-27.97 |
| C11 monoolefins | 3.80 |
| C12 paraffins | 24.36-24.43 |
| C12 monoolefins | 3.9 |
| C13 paraffins | 14.65-14.69 |
| C13 monoolefins | 2.40 |
| C14 paraffins | 1.14 |
| C14 monoolefins | 0.20 |
| Total diolefins* | 0.74 |
| Unknowns | 3.78-3.84 |

*C2-C7 diolefins are negligible contributors to the total diolefin measurement

TABLE 2

| Catalyst | Temperature, ° C. (° F.) | Diolefin Conversion, % | Selectivity, %[1] |
|---|---|---|---|
| Example 1 - 0.02% Pd/0.038% Cu | 55 (131) | 74.3 | 91.7 |
| Example 2 - 0.02% Pd/0.065% Ag | 55 (131) | 63.5 | 78.3 |
| Comparative Example 1 - 0.1% Pd | 55 (131) | 54.1 | 80 |
| Comparative Example 2 - sulfided nickel | 185 (365) | 50 | 52.6 |
| Comparative Example 3 - sulfided nickel | 185 (365) | 66.2 | 70 |

[1]The percentage selectivity is the percentage of diolefin hydrogenated to monoolefin relative to the percentage of monoolefin hydrogenated to paraffin.

The results shown in Table 2 illustrate that the catalysts prepared in Examples 1 and 2 showed diolefin conversion and selectivity results equivalent or better than the second and third reference catalysts, while operating at approximately 130° C. (234° F.) lower in temperature. While operating at the same temperature of 55° C. (131° F.), the catalysts prepared in Examples 1 and 2 showed better diolefin conversion than the first reference catalyst, and the catalyst prepared in Example 1 also showed better selectivity than the first reference catalyst.

Example 3

The catalyst of Example 1 was studied using desorption and adsorption techniques to determine the pore size distribution, the average pore radius, the surface area and the total pore volume of the catalyst. The results of the studies are shown in Table 3.

Example 4

A catalyst was prepared in the manner of the catalyst prepared in Example 2 and having the same metal loadings as the catalyst prepared in Example 2 but having a 200 micron outer layer of alumina. The catalyst was studied using desorption and adsorption techniques to determine the pore radius size distribution, the average pore radius, the surface area and the total pore volume of the catalyst. The results of the studies are shown in Table 3.

TABLE 3

| Catalyst | Example 3 | Example 4 |
| --- | --- | --- |
| Description | 0.02% Pd/ 0.038% Cu (100 micron layer) | 0.02% Pd/0.065% Ag (200 micron layer) |
| BET Surface Area, m$^2$/g | 35 | 64 |
| Tot. Pore vol., cc/g | 0.12 | 0.22 |
| Average pore radius, Angstrom | 71 | 68 |
| Pore Radius Size Distribution, Angstrom | 10-250 | 10-250 |

The results shown in Table 3 demonstrate that the properties of the catalyst are primarily determined by the layer, which can be relatively carefully controlled and that the core contributes very little to the surface area or pore volume. Thus the core primarily defines the bulk properties of the catalyst (pressure drop, for example, as the bulk fluid mechanical properties are sensitive to the gross parameters of the catalyst and not the fine details of layer thickness) and its composition is primarily important as to inertness to reaction while showing good bonding to the layer. Thus it is possible to relatively independently control both the bulk and microscopic properties of the catalyst.

The adsorption and desorption profiles plotted against the pore radius and the differential volume of the catalysts prepared in Examples 3 and 4 are shown in the drawing.

What is claimed is:

1. A process for selectively hydrogenating a $C_8$-$C_{19}$ diolefin to a $C_8$-$C_{19}$ monoolefin in a hydrocarbon mixture comprising the $C_8$-$C_{19}$ diolefin and the $C_8$-$C_{19}$ monoolefin, the process comprising the step of:

bringing the hydrocarbon mixture under selective hydrogenation conditions into contact with a catalyst to give substantially a $C_8$-$C_{19}$ monoolefin product;

wherein the catalyst comprises (a) an inner core comprising a first refractory inorganic component, wherein the first refractory inorganic component is selected from the group consisting of alpha alumina, theta alumina, silicon carbide, metals, cordierite, zirconia, titania and mixtures thereof, (b) an outer layer bonded to said inner core, said outer layer comprising a second refractory inorganic component having dispersed thereon at least one IUPAC Group 10 metal and at least one IUPAC Group 11 metal, wherein the second refractory inorganic component is selected from the group consisting of gamma alumina, delta alumina, eta alumina, theta alumina, silica-alumina, zeolites, nonzeolitic molecular sieves, titania, zirconia, and mixtures thereof, and wherein the first refractory inorganic component has a lower adsorptive capacity than the second refractory inorganic component.

2. The process of claim 1 further characterized in that the catalyst is prepared by a method comprising depositing the at least one IUPAC Group 10 metal and the at least one IUPAC Group 11 metal on the second refractory inorganic component after the outer layer is bonded to the inner core.

3. The process of claim 2 further characterized in that the outer layer is in the presence of a liquid phase during the deposition of the at least one IUPAC Group 10 metal and the at least one IUPAC Group 11 metal onto the second refractory inorganic component.

4. The process of claim 1 wherein the inner core is cordierite.

5. The process of claim 1 wherein the second refractory inorganic component is gamma alumina.

6. The process of claim 1 wherein the at least one IUPAC Group 10 metal is a metal selected from the group consisting of platinum and palladium.

7. The process of claim 1 wherein the at least one IUPAC Group 11 metal is a metal selected from the group consisting of copper and silver.

8. The process of claim 1 further characterized in that the outer layer has a ratio of the at least one IUPAC Group 10 metal to the at least one IUPAC Group 11 metal, and the ratio is substantially constant over the outer layer.

9. The process of claim 1 wherein the outer layer further comprises a modifier metal selected from the group consisting of alkali metals, alkaline earth metals and mixtures thereof.

10. The process of claim 1 wherein the outer layer has a thickness of from about 50 to about 300 micron.

11. The process of claim 1 wherein the outer layer of the catalyst has a surface area of about 50-200 m2/g based on the weight of the outer layer.

12. The process of claim 1 further characterized in that the selective hydrogenation conditions include a temperature of about 30 to about 180° C. and the presence of a liquid phase.

13. The process of claim 1 wherein the selective hydrogenation conditions include a hydrogen to diolefin ratio of about 1:1 to about 2:1.

* * * * *